(12) United States Patent
Hirst

(10) Patent No.: US 7,987,170 B2
(45) Date of Patent: *Jul. 26, 2011

(54) SYSTEMS AND METHODS FOR IMPROVING INFORMATION DISCOVERY

(75) Inventor: Roy Hirst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/330,461

(22) Filed: Dec. 8, 2008

(65) Prior Publication Data

US 2009/0089271 A1    Apr. 2, 2009

Related U.S. Application Data

(63) Continuation of application No. 10/729,520, filed on Dec. 5, 2003, now Pat. No. 7,472,118.

(51) Int. Cl.
G06F 17/30 (2006.01)

(52) U.S. Cl. ......................................... 707/706

(58) Field of Classification Search ................... 707/706
See application file for complete search history.

(56) References Cited

U.S. PATENT DOCUMENTS

| | | |
|---|---|---|
| 4,943,932 A | 7/1990 | Lark et al. |
| 5,748,973 A | 5/1998 | Palmer et al. |
| 5,960,422 A | 9/1999 | Prasad |
| 6,029,195 A | 2/2000 | Herz |
| 6,158,031 A | 12/2000 | Mack et al. |
| 6,205,471 B1 | 3/2001 | Gilchrist et al. |
| 6,237,136 B1 | 5/2001 | Sadahiro |
| 6,493,719 B1 | 12/2002 | Booth et al. |
| 6,651,253 B2 | 11/2003 | Dudkiewicz et al. |
| 6,675,370 B1 | 1/2004 | Sundaresan |
| 6,681,223 B1 | 1/2004 | Sundaresan |
| 6,687,696 B2 | 2/2004 | Hofmann et al. |
| 7,472,118 B2 | 12/2008 | Hirst |
| 2002/0059204 A1 | 5/2002 | Harris |
| 2002/0120712 A1 | 8/2002 | Maislin |
| 2003/0126559 A1 | 7/2003 | Fuhrmann |
| 2004/0139107 A1 | 7/2004 | Bachman et al. |
| 2004/0158560 A1 | 8/2004 | Wen et al. |
| 2004/0205448 A1 | 10/2004 | Grefenstette et al. |

OTHER PUBLICATIONS

N. Ramsey, "Literate Programming Simplified", IEEE, vol. 11, Issue 5, Sep. 1994, pp. 97-105, http://ieeexplore.ieee.org/iel1/52/7538/00311070.pdf?isnumber=7538II=JNL&arnumber=311070 &arnumber=311070&arSt=97&ared=105 &arAuthor=Ramsey%2C+N.

J. Bentley et al., "Programming Pearls: Literate Programming", ACM 29, May 1986, pp. 384-369, http://doi.acm.10.1145/5689.315644.

D. Knuth, "Literate Programming", 1983, pp. 1-15.

L. Friendly, "The Design of Distributed Hyperlinked Programming Documentation", 1995.

R. Jennings, "Working with Relations, Key Fields, and Indexes", Special Edition: Using Access '97, Second Edition, Published Oct. 9, 1997.

(Continued)

Primary Examiner — Mark Andrew X Radtke
(74) Attorney, Agent, or Firm — Workman Nydegger

(57) ABSTRACT

The present invention relates to a system and methodology to facilitate automated retrieval and classification of information. A system and associated methods are provided that facilitate generation of code and/or documents. The system includes a component that receives data relating to at least one of a user's request for desired code functionality and one or more desired documents. A mapping component correlates parsed subsets of the data to specific functional objects respectively located remote from the user, wherein a generator employs the functional objects to form at least one of the desired code and the documents.

14 Claims, 9 Drawing Sheets

OTHER PUBLICATIONS

A. Marcus et al., "An Information Retrieval Approach to Concept Location in Source Code", Proceedings of 11th Working Conference on Reverese Engineering, Nov. 8-12, 2004, pp. 214-223, http://ieeexplore.ieee.org/ie5/9462/30025/01374321.pdf?isnumber=30025II=STD&arnumber=1374321&arnumber=1374321&a.

S. Paul et al., "A Framework for Source Code Search Using Program Patterns", IEEE Transactions on Software Engineering, vol. 20, No. 6, pp. 463-475, Jun. 1994.

R.C. Seacord, "AGORA: A Search Engine for Software Components", IEEE International Computing, vol. 2. No. 6, Nov./Dec. 1998, pp. 62-.

C.L. Giles et al., "CiteSeer: An Automatic Citation Indexing System", In Proceedings of the Third ACM Conference on Digital Libraries (Pittsburgh, PA, USA, Jun. 23-26, 1998), I, ACM Press, New York, NY, pp. 89-98, http://doi.acm.org/10.1145/2.

H,. Hohl et al., "HYPADAPTER: An Adaptive Hypertext System for Exploratory Learning and Programming", User Modelling and User Adapted Interaction, vol. 6(2), pp. 131-155, 1996.

Christofer Staff, "Hypercontext: A Model for Adaptive Hypertext", In Proceedings of the 6th International Conference in User Modeling, 1997, 3 pages.

Gerd Kamp, "Multiple Case Representations and Similarity-based Systems", Department of Computer Science, University of Hamburg, 1996, 8 pages.

A.M. Zaremski et al., "Specification Matching of Software Components", ACM Transactions of Software Engineering and Methods, vol. 6, Issue 4, 1997, pp. 333-369.

Office Action mailed May 23, 2006 cited in U.S. Appl. No. 10/729,520.

Office Action mailed Sep. 26, 2006 cited in U.S. Appl. No. 10/729,520.

Office Action mailed Feb. 23, 2007 cited in U.S. Appl. No. 10/729,520.

Office Action mailed Aug. 9, 2007 cited in U.S. Appl. No. 10/729,520.

Office Action mailed Feb. 8, 2008 cited in U.S. Appl. No. 10/729,520.

Notice of Allowance mailed Jul. 22, 2008 cited in U.S. Appl. No. 10/729,520.

SYSTEMS AND METHODS FOR IMPROVING INFORMATION DISCOVERY

CROSS REFERENCE TO RELATED APPLICATIONS

This application is a continuation of U.S. patent application Ser. No. 10/729,520 entitled "SYSTEMS AND METHODS FOR IMPROVING INFORMATION DISCOVERY" and filed Dec. 5, 2003. The entireties of the above-referenced application is hereby incorporated by reference.

TECHNICAL FIELD

The present invention relates generally to computer systems, and more particularly to a system and method that automatically retrieves information associated with an unfamiliar data format via an object mapping of terms having a familiar data format.

BACKGROUND OF THE INVENTION

Software development has emerged as one of the most rapidly changing areas of technological advancement. From room-sized computing systems of yesterday to the high performance desktop or portable machines of today, development platforms along with associated development environments continually change in response to technological innovation. One area where these changes are readily apparent is in the software development industry, wherein computer systems designers and architects often have a plurality of tools at their disposal in order to create a desired application. These tools can include hardware assets such as personal computers, emulators, traffic or network analyzers, and other instruments to aid in software component design. Software development tools can be even more numerous. For example, such tools can include development platforms, compilers, linkers, assemblers, debuggers, modelers, and other tools in addition to a plurality of different programming language environments that may be required for various design problems.

Each of the respective tools described above can include a plurality of differing functionality. Thus, in order to become proficient with a given tool, programming language, or development environment, one must become acclimated with the technical terminology associated with the respective tool in order to properly utilize and exploit underlying features of the tool. In one example, many operating system environments offer software packages known as development platforms or "studios." These platforms may also include support for various programming languages such as Visual Basic, C++, Java, C#, J#, and XML to name but a few examples.

Along with which language is selected for development, software designers often have to consider and design for a particular runtime environment. For example, in previous generation operating systems, objects were responsible for managing object lifetimes such as via techniques known as reference counting. Object communications were often achieved via such models as the Component Object Model (COM). Newer virtual machine environments can now automatically manage object lifetime such as through employment of a system garbage collector to reclaim an object that is no longer being accessed. These systems can also more seamlessly integrate with Web type developments such as via XML protocols, Simple Object Access Protocols (SOAP), and Web Services Description Language (WSDL), for example.

Other design issues involve runtime code generation considerations that may include aspects relating to Just-in-Time (JIT) compilation techniques. Such techniques can include late bound calls that are found in languages such as Visual Basic, ECMAScript, Python, Perl, PHP, Scheme, Ruby, and so forth. In these languages, the types of a receiver and arguments of a method call are generally not known statically, whereas managed system method call instructions (e.g., call, callvirt, ldftn, ldvrtftn) require respective static types of the method arguments and result. Hence, a method dispatch is performed dynamically based on the runtime types of the receiver, actual arguments, and the static name of the method. This interpretative layer is one of the main reasons that late bound languages do not perform as well as statically typed languages. As can be appreciated, the above tools, languages, design, and associated runtime considerations are too numerous to outline. Thus, forming an understanding of all the various components and interactions in a typical development environment remains a constant and complicated challenge—even for the most experienced of designers.

With continued improvements in high-level programming languages and the trend to abstract often-required functionality of a technology into objects that allow the functionality to be readily accessed and re-used, it is the technical complexity of documentation and the elapsed time and cost of discovering and interpreting needed information that is becoming a significant barrier to the software developer. For commercial (I/T) software development, information discovery time is one of the single largest obstacles to software developer productivity. In addition, as the pace of software technology change accelerates, more developers than ever are working with technologies that they have less than two years experience with. A software developer can attempt to discover and interpret both technology-specific and programming-language-specific functionality using heterogeneous content that frequently includes natural and professional language independent of that used by the author of the technical documentation. Such attempts frequently fail because of the lack of shared language between software developer and documentation author. Also, previous methods of indexing technical materials are generally no longer adequate to meet these extra demands.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate automated discovery of information. In one aspect, an improvement to document and information discoverability is provided by reducing observed costs, reducing development time, and increasing profitability of development. The present invention enables a software developer (or other entity seeking knowledge) to discover and interpret technology-specific and programming-language-specific functionality utilizing natural and professional languages that can be independent of that employed by the author of the associated technical documentation describing such functionality. By tracking and mapping developer terminology and navigation across technical topics within a technical documentation set, the present invention allows software developers to use locally well-known terms to discover and interpret the functionality of a programming language, a technology, or its associated objects.

In one aspect, functional information is retrieved by creating objects that reflect technology vocabulary, programming vocabulary, and/or document navigation patterns that is familiar to developers or information seekers. These objects can be applied to knowledge generators such as search engines and keyword indexing schemes associated with a document set (or sets) in order to generate requested information. In another aspect, a database of search attempts can be created wherein technical information is weighted according to its respective value to those who have previously sought similar types of information. The weighted information can be employed as a significant indicator of technical value for selected technical information within a documentation set. Thus, developers can easily and quickly gauge potential effectiveness of accessing a selected document, for example.

Weighting of information can be achieved by automatically monitoring visible technical documentation, associated search engine activity, and network traffic activity, for example. Results of the monitoring are then analyzed, wherein information can be automatically ranked according to the analysis. Other aspects include cross-indexing between one type of documentation or data to another type of documentation or data via an automated mapping process between data sets. Also, one or more user interfaces can be provided to facilitate information retrieval, cross-indexing, and document ranking in accordance with the present invention.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automated retrieval and classification of information. Technical terms and vocabulary that is familiar to developers is employed to construct functional objects that capture such familiarity across various technical topics. When a particular programming function or technical documentation is sought in a documentation set or database, a user or developer employs well-known terms in a natural language or technical syntax that is familiar to the user even though the terms may be different than those selected by the respective authors of the documentation set. A mapping component correlates language in the documentation set with the terms that are familiar to the user via the functional objects. The functional objects can then be automatically submitted to a search engine or indexer of new or unfamiliar items to retrieve desired functional information for the user. In one aspect, a system is provided that facilitates generation of code and/or documents. The system includes a component (e.g., discovery tool) that receives data relating to at least one of a user's request for desired code functionality and one or more desired documents. A mapping component correlates parsed subsets of the data to specific functional objects respectively located remote from the user, wherein a generator employs the functional objects to form at least one of the desired code and the documents.

As used in this application, the terms "component," "object," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
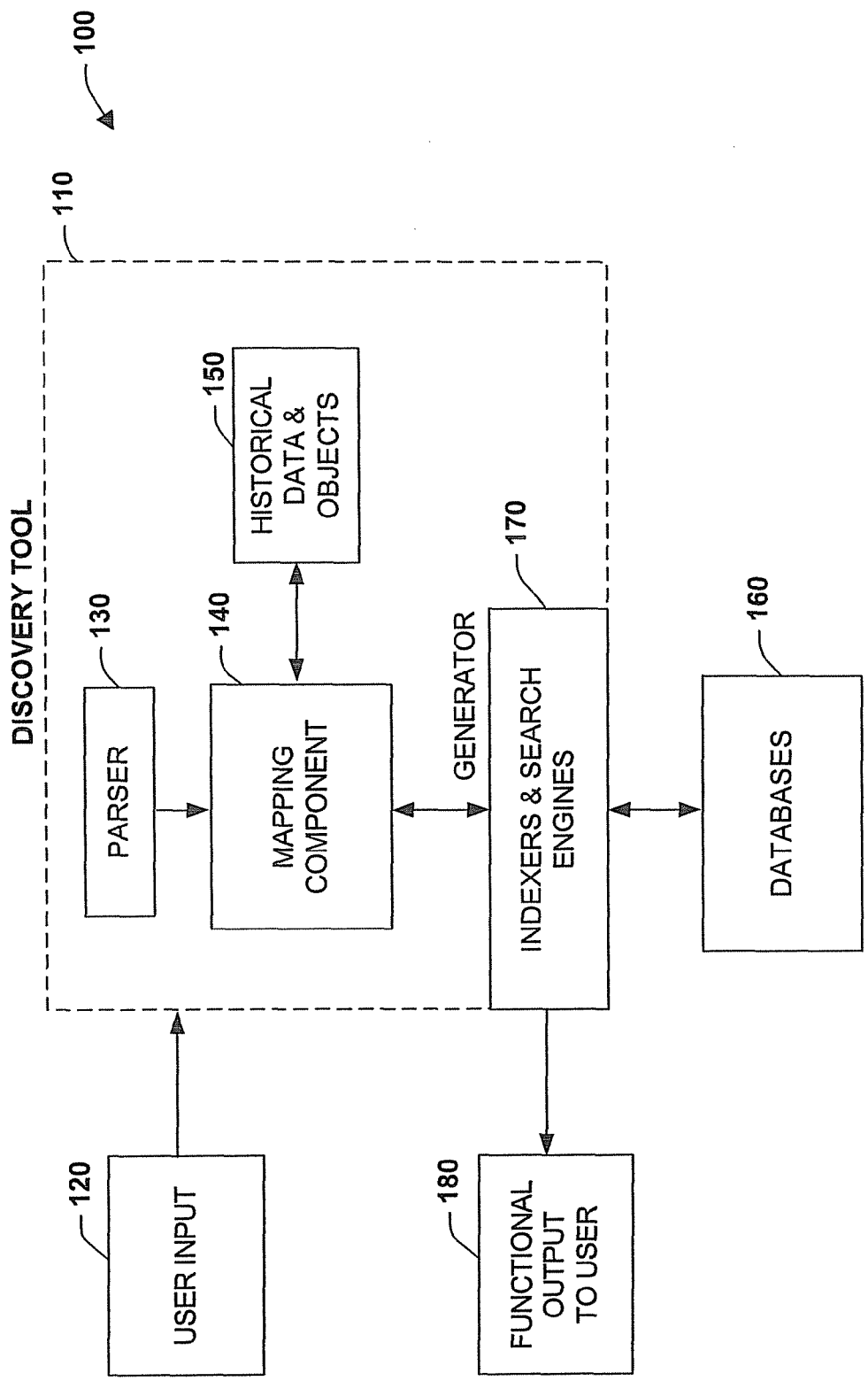
FIG. 1 is a schematic block diagram of an information discovery tool in accordance with an aspect of the present invention.

Referring initially to FIG. 1, an information discovery system 100 is illustrated in accordance with an aspect of the present invention. The system 100 includes a discovery tool 110 that receives user input 120 in the form of a request for information (e.g., text, voice encoded speech, video camera input). The requested information can be in the form of a natural language or syntax that is familiar to the user. In other words, terms and expressions that have been employed over time by the user can be utilized to acquire new information relating to a data or document set. User input 120 can be processed by a parser 130 into functional components relating to information components or portions of speech or text that are processed to facilitate desired information retrieval.

The parser 130 processes various aspects of languages, whereby a language is a (possibly infinite) set of sentences. A language such as Spanish is a natural language, whereas Java is a programming language. These languages can be processed into a set of strings (ab, aabb, aaabbb, . . . ). The parser 130 may also include a recogniser (not shown) that is a program that uses a grammar to determine if a given string is admitted by that grammar, whereas the parser 130 can be a program that uses a grammar to build a structural representation of a given string in accordance with the rules of the grammar. After the user input 120 has been parsed, a mapping component 140 analyzes the parsed strings or components in view of one or more functional objects or data residing in a historical data store 150.

Functional components or objects in the data store 150 represent vocabulary and terminology that is familiar to the user and which has been modeled or learned from past user (or users) patterns when searching for or seeking information. This can also include rules or models that map or analogize one set of terms with a subsequent set of terms. The mapping component 140 employs the functional components in the data store 150 to build or create search terms or queries that are can be applied to a remote and/or local database 160 via a generator component 170. The generator 170 can include substantially any type of automated search engine, indexing engine, or structured query language engine for retrieving information from the database 160. Information in the database 160 may be from a new or different source that the user has previously worked with. Thus, the mapping component 140 automatically crafts search terms for the generator 170 utilizing terms that are associated with unfamiliar data structures in the database 160, yet are consistent or correlated to the type of information sought by the user and in accordance with language or search terms that are familiar to the user. In this manner, users can quickly learn new information while mitigating formalities or nuances associated with differing document authors or data originators.

In one particular example, a user may desire to know what functionality is required to implement an object function or method in a programming language that the user has not experienced before and therefore would not necessarily know how to request or search for the desired functionality. However, the user may be familiar with functional or syntactic terms from a previous programming language. The user may submit a request to the discovery tool 110 employing familiar terms and concepts. The mapping component 140 then parses the request, utilizes the functional objects in the data store 150 to find an analogous term or synonym for the term, and submits the term or terms to the generator 170. The generator 170 accesses the database 160 to retrieve the desired information and returns a functional output expression (e.g., text graphics, audio, video, and so forth) to the user at 180. Thus, the mapping component 140 automatically correlates terms in a language familiar to a user to that of a subsequent language which in turn facilitates directing functional output or desired information to the user at 180. In this manner, user's can quickly learn new techniques from techniques and knowledge previously acquired while mitigating learning associated with unfamiliar information.

As noted above, the functional objects in the data store 150 may include rules or models that have been determined from past user activities such as from previous searches for information. Such models can be automatically constructed from learning algorithms or learning components. This may also include artificial intelligence techniques, automated classification methods, inference analysis, probability analysis, statistical processing, and components such as neural networks. For example, learning algorithms can include employment of classifiers that are configured to analyze associated attributes of terms and/or vocabulary, wherein a feature vector assigns a weight or value to the attribute based upon learning processes applied to training members or data of the attribute's class or topic. Classifiers can be stated as a function that maps an input attribute to the confidence that the input belongs to a class and can include such techniques as Support Vector Machines (SVM), Naive Bayes models, Bayes networks, decision trees, similarity-based models, vector-based models, Hidden Markov Models and/or other learning models or combinations thereof.

It is to be appreciated that other decision-theoretic analysis can also be employed in conjunction with the learning algorithms to determine how to generate desired search terms for the generator 170. For example, this may also include analyzing extrinsic evidence or data of a user's present context state, and directing information in accordance with the data. Such data can include evidence of keyboard activities, mouse movements, microphone inputs, camera inputs and substantially any indication of the user's activity such as time and electronic calendar information relating to the user's activity (e.g., automatically retrieve information if the user appears to be hovering over a particular item indicating non-understanding or detecting a sigh of exasperation).

Figure 2:
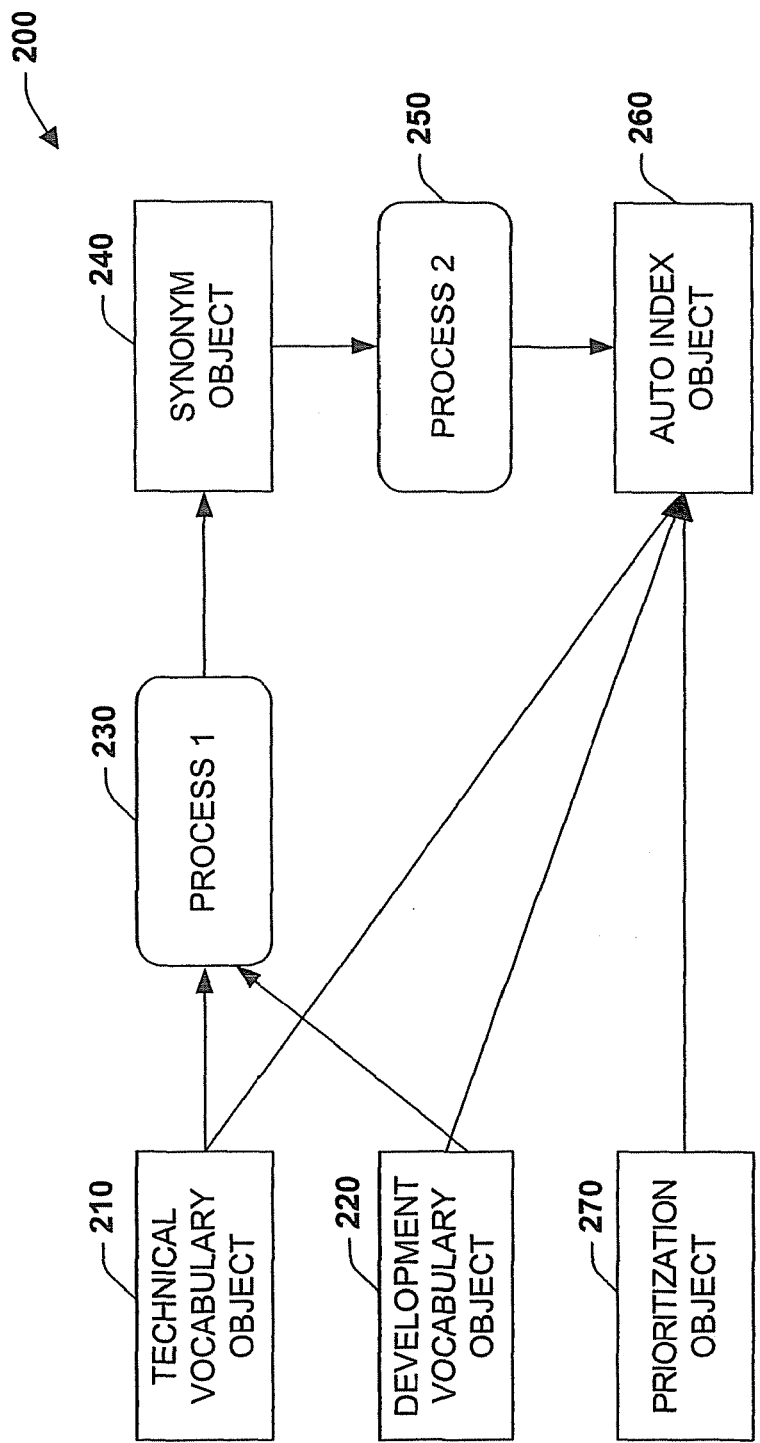
FIG. 2 is a flow diagram of an object creation and mapping process in accordance with an aspect of the present invention.
Figure 7:
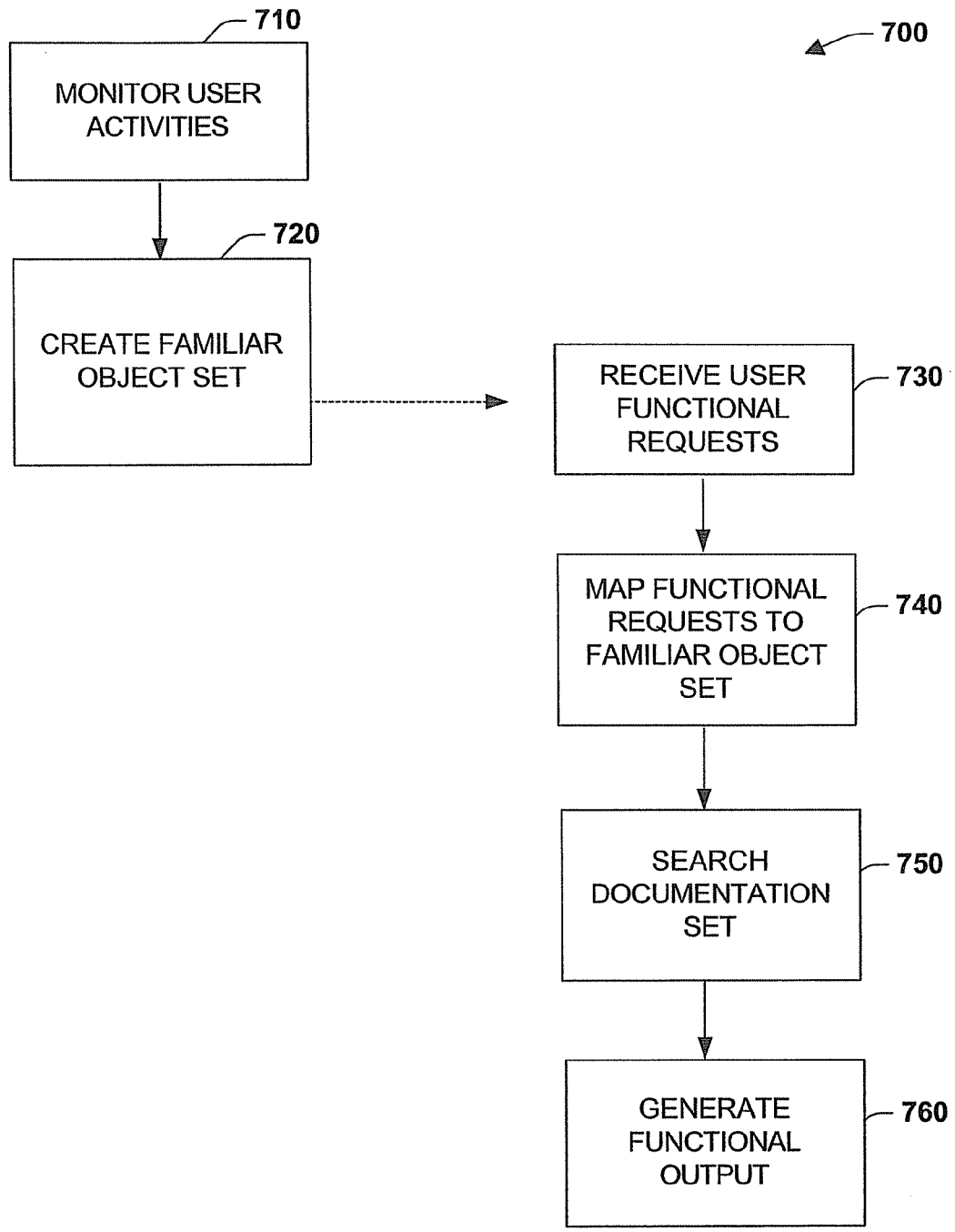
FIG. 7 is a flow diagram illustrating a discovery process in accordance with an aspect of the present invention.

FIGS. 2 and 7 are flow diagrams illustrating object creation and information discovery processes in accordance with an aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 2, an object creation and mapping process 200 is illustrated in accordance with an aspect of the present invention. Various objects are represented in the process 200 to facilitate mapping of terminology in a first or familiar language that leads to functional output from a subsequent or unfamiliar language. These objects can include a technical vocabulary object 210 and/or a development vocabulary object 220 which are mapped according to a first process 230 to a synonym object 240. As noted above, this type mapping to the synonym object can include rules that map functional phrases or technical terms to a vocabulary associated with the synonym object. The mapping can also include more elaborate processes such as learning algorithms or expert system analysis. When mapped via the process 230, the synonym object 240 is employed to discover new information via a subsequent discovery process 250.

In one example, if a developer were to phase a query as "What methods are linked for late-bound calls?" The process 200 would invoke the synonym object 240 to determine which phrases within the synonym object were functionally related to the above query. Continuing with the above example, the process 250 may determine that for a subsequent language or document, late bound calls are related to a new phase or term such as "Functional components invoked at runtime." Thus, when developers seek information relating to late-bound calls, they receive functional information that is similar to the functionality requested yet in the language of the subsequent or other information system which is related or analogous to the query at hand. Upon determining a functional equivalent to the information sought by the developer, the process 250 invokes an auto index object 260 that can automatically retrieve an electronic index of topics related to the topic sought by the developer and/or the object can submit a functional query to a local and/or remote search engine to retrieve more information on the requested topic. Other objects that can be provided include a prioritization object 270 that enables sorting and/or ranking of information according to its relevancy with respect to the information requested by the developer (e.g., returned topic 1 is more likely on point than returned topic 4).

Figure 3:
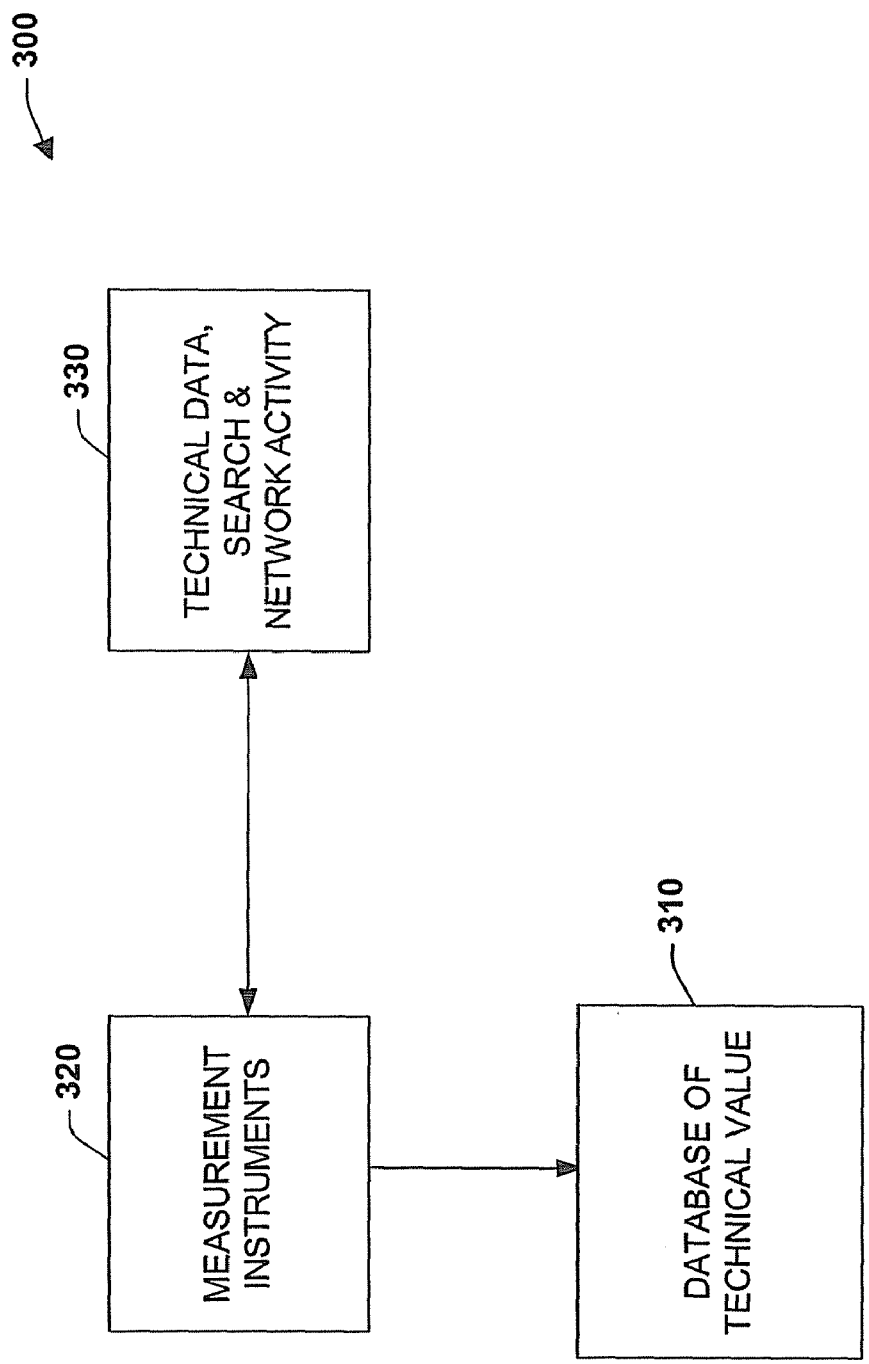
FIG. 3 is a diagram illustrating a weighted mapping system in accordance with an aspect of the present invention.

Turning to FIG. 3, a weighted mapping system 300 is illustrated in accordance with an aspect of the present invention. In this aspect, the subject invention enables tracking and mapping of attempts, both successful and unsuccessful, to discover and interpret technology-specific and programming-language-specific functionality using natural and/or professional language, for example that can be independent of that used by an author of respective technical documentation. By tracking and mapping developer terminology and navigation, a database 310 of search attempts can be created which is a significant indicator of technical value for selected technical information within a documentation set or other data structure residing in the database (or databases). This can be achieved by instrumenting (or monitoring) via measurement instruments 320 visible technical documentation, associated search engine activity, and/or and network traffic activity at 330, and then analyzing the results of the instrumentation. Such automated measurements can include counters that measure network and documentation access or frequency. Other measurements can include the type of words employed in a respective search to enable a vocabulary of common terms to be constructed. Other measurements can be implied or inferred (e.g., via learning process) from the type of activity encountered. For example, the amount of time that a curser hovers over a particular item or extrinsic evidence of confusion or curiosity (e.g., if a developer copies a data item from a site, may indicate particular value of information as opposed to merely reading data from data site). Still yet other types of measurements may include explicit requests from users regarding a data source's technical value, ranking or merit. An example measurement interface is illustrated and described below with respect to FIG. 4.

Figure 4:
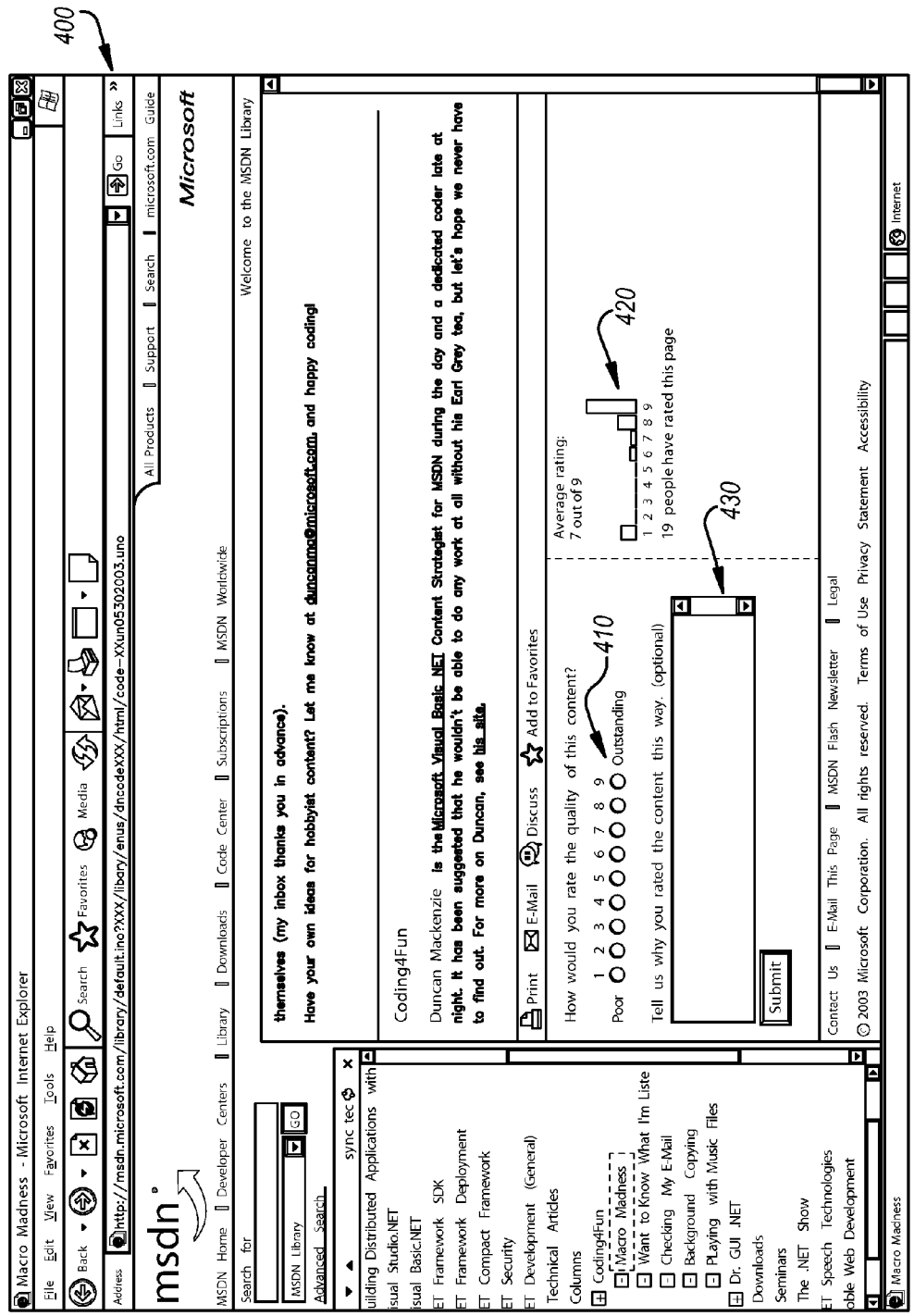
FIG. 4 is a diagram illustrating an example ranking component in accordance with an aspect of the present invention.

FIG. 4 illustrates an example ranking component 400 in accordance with an aspect of the present invention. In this aspect a user interface 400 is provided to gauge a particular data item's technical value or significance to a user of such data. It is to be appreciated that the interface 400 and other interfaces described below are exemplary in nature and are not limited to the particular examples shown. For example, the interface 400 can include one or more display objects (e.g., icon) that can include such aspects as configurable icons, buttons, sliders, input boxes, selection options, menus, tabs and so forth having multiple configurable dimensions, shapes, colors, text, data and sounds to facilitate operations with the systems described herein. In addition, the user inputs can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the various components described herein.

As illustrated, the interface 400 includes various portions to enable users to rank or score data. For example, at 410, a ratings scale from 1 to 9 is provided to enable user rankings from poor on a low end to outstanding on a high end. Feedback 420 may also be provided to allow users to determine what others thought of the associated material or data. At 430, an input box may be provided to enable users to submit feedback as to why they ranked a particular data item in the manner that was selected. As can be appreciated other types of ranking or scoring are possible (e.g., a drag bar that allows users to pull bar from 0 to 100% indicating utility of data item).

Figure 5:
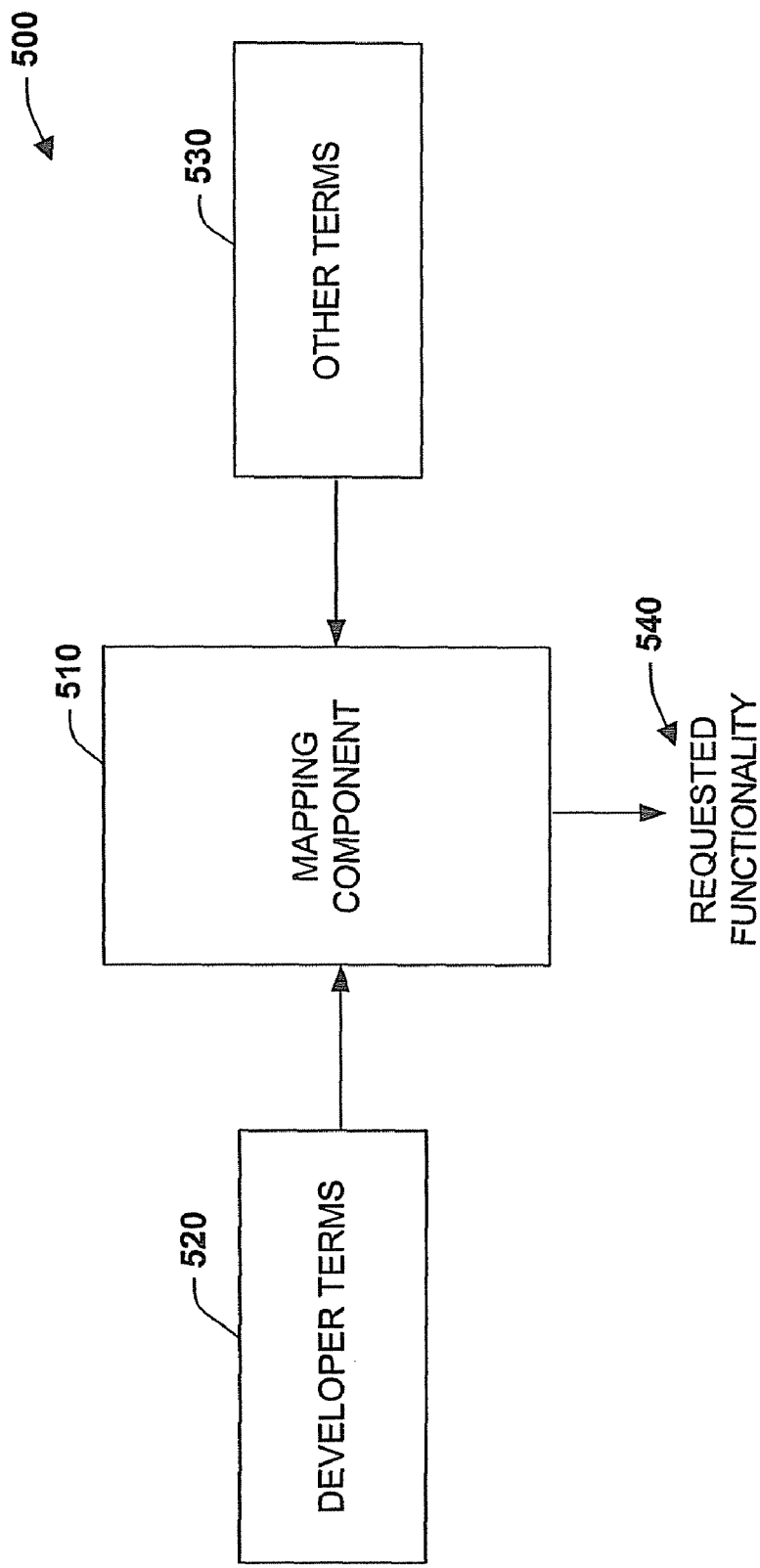
FIG. 5 is a diagram illustrating a cross-indexing system in accordance with an aspect of the present invention.

FIG. 5 illustrates a cross-indexing system 500 in accordance with an aspect of the present invention. In this aspect, a mapping component 510 correlates or cross-indexes one or more developer terms with one or more other terms 530 such as from another documentation set or development language. The mapping component 510 can generate requested functionality 540 in a plurality of different formats. For example, a table of developer terms can be displayed with a table of other or mapped terms. A single table can show cross-functional relationships including arrows or other indicators depicting relationships between terms. Modular or graphical outputs are also possible such as in the generation of a block diagram in developer terms that highlights or points to a corresponding block diagram of analogous terms. This could also include generation of a system drawing to show one component's relationship to the system in developers terms while also illustrating, fading, superimposing, or highlighting a related term on the system drawing to detail the relationship between terms or phrases. Also, if pure analogous terms are not available, contrast blocks or diagrams can be displayed detailing differences with conventional terminology or design practices.

Figure 6:
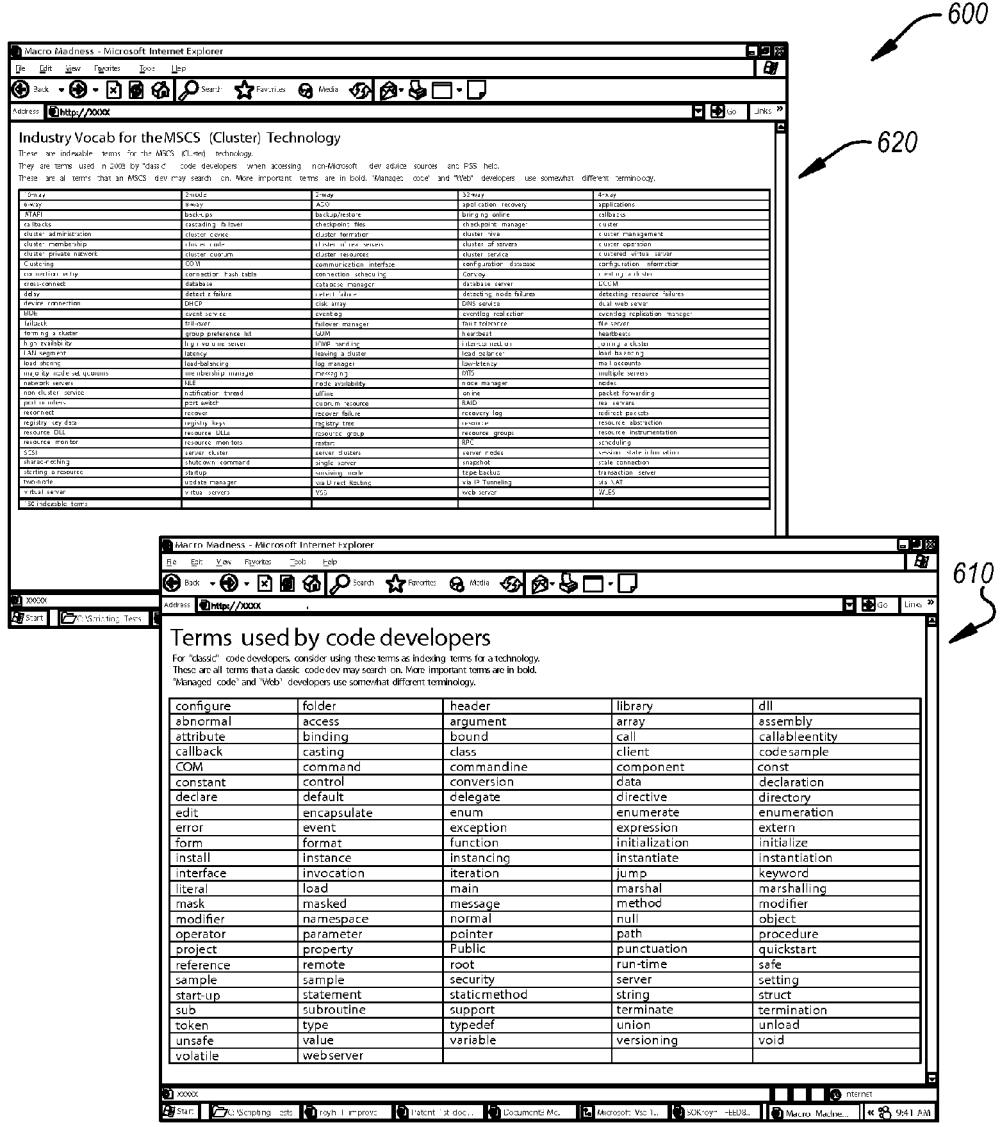
FIG. 6 is a diagram illustrating an example cross-index in accordance with an aspect of the present invention.

FIG. 6 is a diagram illustrating an example cross-index 600 that can be generated in accordance with an aspect of the present invention. In furtherance of the discussion above with respect to FIG. 5, an example cross-index of mapped terms is illustrated. At 610, an example user interface depicts one or more terms that are commonly employed by developers. Such terms can be derived from the instrumentation and monitoring processes described above, from survey data collected from developers, or from more elaborate processes such as from classifiers that are automatically trained to classify the types of information that may be useful or important to developers. At 620, a cross-index of one or more other terms can also be displayed that are mapped or correlated to the developer terms 610. As noted above with respect to FIG. 5, various formats are possible for displaying or cross-indexing terms from one system (e.g., developer terms) to a subsequent system of terms (e.g., industry standard terms, document terms, or program-related terms).

FIG. 7 depicts an information discovery process 700 in accordance with an aspect of the present invention. Proceeding to 710, user activities are automatically monitored. This can include monitoring the types of sites user's visit, mouse activities, information retrieved, search terms employed, number of times visiting a site, the types of requests that are generated and so forth. This can also include explicit requests of information (or feedback) from users to determine the types of terms or phrases that are commonly employed. At 720, a familiar object set or synonym object set is automatically created from the user activities that were monitored at 710. From this object at 720, a mapping process is illustrated at 730-760 to facilitate retrieval of desired functional information relating to a new or different documentation or data set.

At 730, a functional request for information is received from a user (also could be a request from another machine or web site). At 740, the functional request from the user is automatically mapped via the familiar object set created at 720 to terms or phrases that correlate to a subsequent data set, programming language, documentation set, data information store, and so forth. At 750, the terms that have been correlated to the familiar object set of 720 are automatically applied or directed to one or more search engines, local and/or remote databases, electronic indexes and so forth. At 760, information received from the search process of 750 is provided to the user as functional output related to common terms that are familiar to the user yet retrieved, stored, viewed, listened to and/or displayed, in accordance with terms or phrases of a new or subsequent data description.

Figure 8:
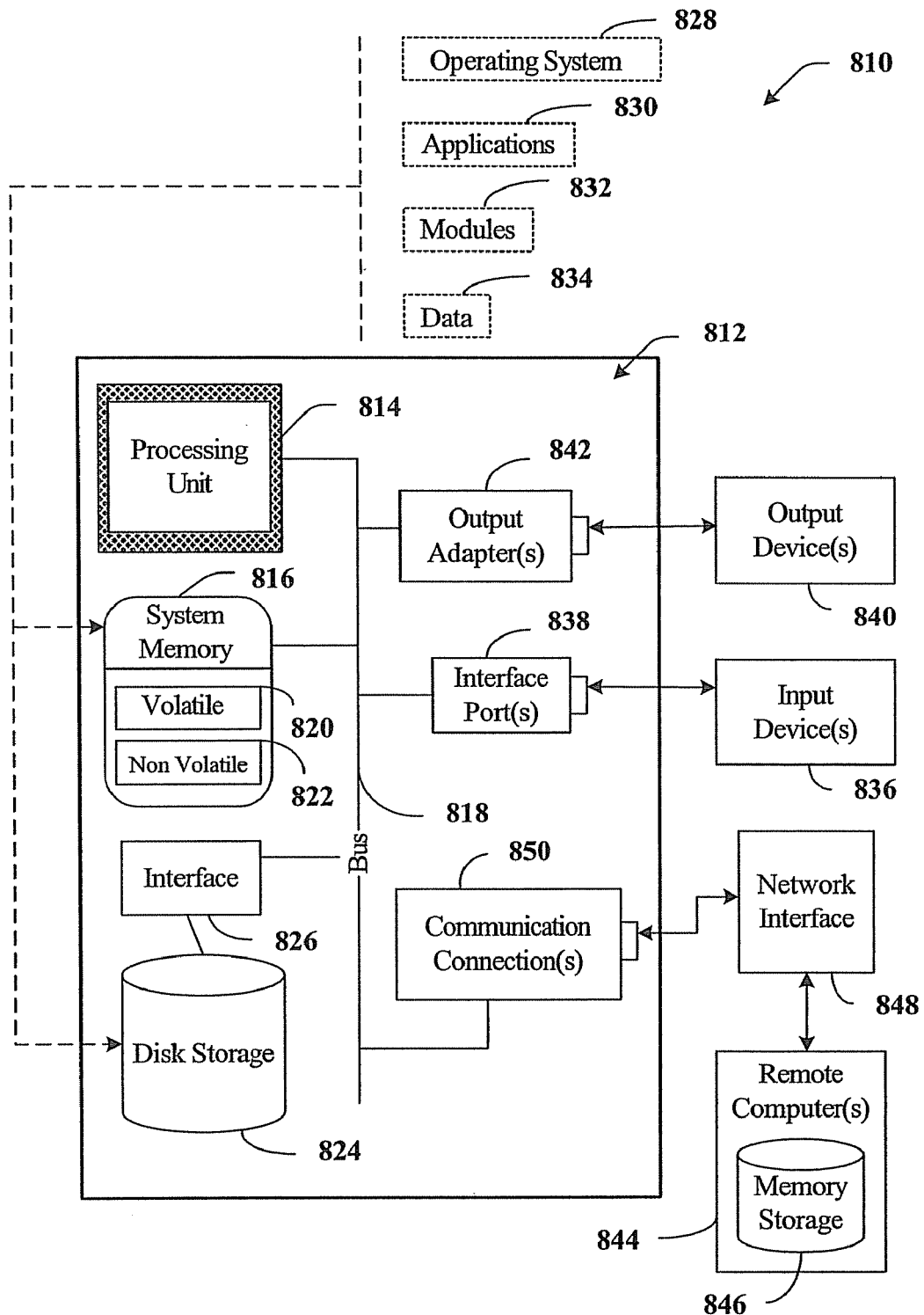
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
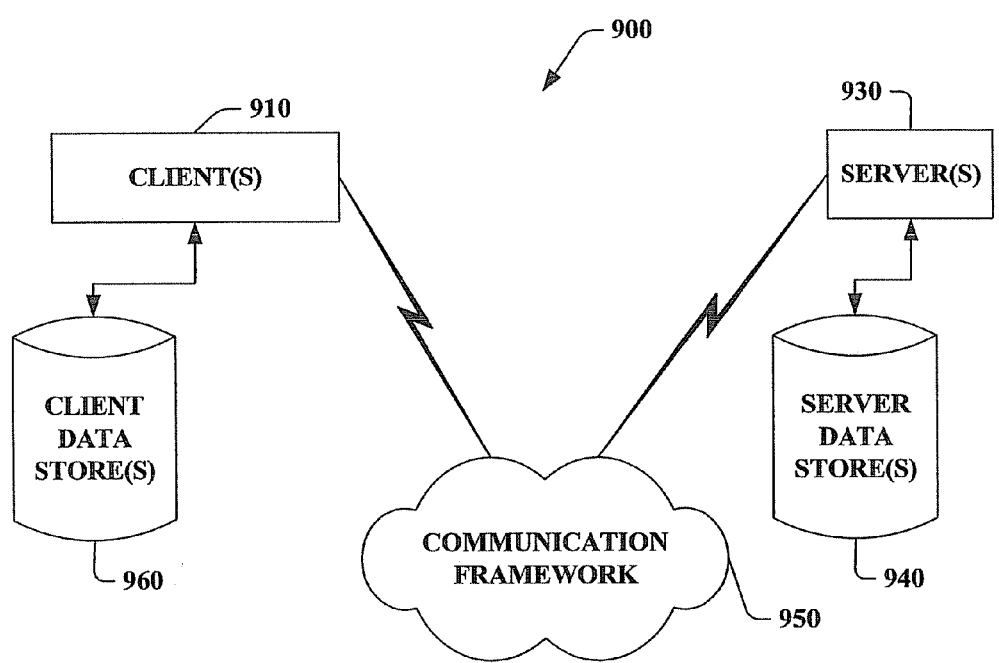
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system, comprising:
    one or more processors; and
    one or more computer storage devices having stored thereon computer executable instructions that, when executed by the one or more processors, implement a method for retrieving information in a second programming language based on a request for information in a first programming language, the method comprising:
        the computer system receiving user input from a user in the form of a request for information, wherein the request for information comprises one or more first search terms in the form of a first programming language that is familiar to the user, including one or more search terms that have been employed over time by the user;
        the computer system parsing the user input into parsed strings to facilitate the request for information;
        the computer system mapping the parsed strings to semantically equivalent strings in a second programming language in view of one or more functional objects that include vocabulary and terminology of the first programming language that has been modeled from past user patterns when requesting information, wherein the one or more functional objects are associated with a decision-theoretic analysis that includes analyzing extrinsic evidence or data of a user's present context state and directing information in accordance with the data;
        the computer system generating one or more second search terms in the form of the second programming language, wherein the one or more second search terms are semantically equivalent to the one or more first search terms;
        the computer system requesting information from one or more databases based upon the one or more second search terms; and
        the computer system providing one or more results of the request to the user, wherein the results comprise at least one result including terms in the form of the second programming language.

2. The computer system of claim 1, wherein mapping comprises applying at least one of a rule, a learning algorithm, an automated classification method, an inference model, a probability model, a statistical model, a neural network, a Support Vector Machine (SVM), a Naive Bayes model, a Bayes network, a decision tree, a similarity-based model, a vector-based model, or a Hidden Markov Model.

3. The computer system of claim 1, wherein mapping comprises applying at least one of a technical vocabulary object, a development vocabulary object, a synonym object, an index object, or a prioritization object to facilitate retrieval of information.

4. The computer system of claim 1, wherein requesting information from the one or more databases comprises requesting information from at least one of an automated search engine, an indexing engine, or a structured query language engine.

5. The computer system of claim 1, further comprising: determining an importance value for the one or more results based on at least one of visible technical documentation, search engine activity, or network traffic activity.

6. The computer system of claim 1, further comprising tracking and mapping successful and unsuccessful attempts to discover and interpret technology-specific and programming-language-specific functionality employing a natural or professional language.

7. The computer system of claim 1, wherein the at least one result comprises a technical document, further comprising:
    the computer system displaying a graphical user interface that provides at least one user interface control that permits the user to determine a relevance value for the technical document which was retrieved based on the user's request for information.

8. The computer system of claim 7, wherein the graphical user interface includes at least one of a ratings scale, a feedback component to allow users to determine what others thought of the technical document, or an input box to enable users to submit feedback as to why they ranked a particular technical document in the manner that was selected.

9. A method, implemented within a computer system that includes one or more processors and memory storing instructions which, when executed by the one or more processors, implement the method for retrieving information in a second programming language based on a request for information in a first programming language, the method comprising:
    a computer system, which includes one or more processors, receiving user input from a user in the form of a request for information, wherein the request for information comprises one or more first search terms in the form of a first programming language that is familiar to the user, including one or more terms that have been employed over time by the user;
    the computer system parsing the user input into parsed strings to facilitate the request for information;
    the computer system mapping the parsed strings to semantically equivalent strings in a second programming language in view of one or more functional objects that include vocabulary and terminology of the first programming language that has been modeled from past user patterns when requesting information, wherein the one or more functional objects are associated with a decision-theoretic analysis that includes analyzing extrinsic evidence or data of a user's present context state and directing information in accordance with the data;
    the computer system generating one or more second search terms in the form of the second programming language, wherein the one or more second search terms are semantically equivalent to the one or more first search terms;
    the computer system requesting information from one or more remote or local databases based upon the one or more second search terms; and the computer system providing one or more results of the request to the user, wherein the results comprise at least one result including terms in the form of the second programming language.

10. The method of claim 9, wherein the request for information includes at least one of text input, voice encoded input, video camera input and audio input.

11. The method of claim 9, further comprising determining an importance value for a request for information and monitoring at least one of visible technical documentation, search engine activity, and network traffic activity.

12. The method of claim 9, further comprising allowing users to interactively input relevancies of search results and utilizing the relevancies to perform further searches.

13. The method of claim 9, wherein the one or more functional objects include vocabulary and terminology that has been modeled from past patterns of a plurality of users.

14. One or more computer storage devices having stored thereon computer executable instructions that, when executed by one or more processors of a computer system, implement a method for retrieving information in a second programming language based on a request for information in a first programming language, the method comprising:

a computer system, which includes one or more processors, receiving user input from a user in the form of a request for information, wherein the request for information comprises one or more first search terms in the form of a first programming language that is familiar to the user, including one or more terms that have been employed over time by the user;

the computer system parsing the user input into parsed strings to facilitate the request for information;

the computer system mapping the parsed strings to semantically equivalent strings in a second programming language in view of one or more functional objects that include vocabulary and terminology of the first programming language that has been modeled from past user patterns when requesting information, wherein the one or more functional objects are associated with a decision-theoretic analysis that includes analyzing extrinsic evidence or data of a user's present context state and directing information in accordance with the data;

the computer system generating one or more second search terms in the form of the second programming language, wherein the one or more second search terms are semantically equivalent to the one or more first search terms;

the computer system requesting information from one or more databases based upon the one or more second search terms; and the computer system providing one or more results of the request to the user, wherein the results comprise at least one result including terms in the form of the second programming language.

* * * * *